US012327509B2

(12) United States Patent
He et al.

(10) Patent No.: US 12,327,509 B2
(45) Date of Patent: Jun. 10, 2025

(54) COMPENSATION METHOD FOR A DISPLAY AREA WITH AN UNDER-DISPLAY CAMERA, DEVICE, AND STORAGE MEDIUM

(71) Applicant: ZTE CORPORATION, Shenzhen (CN)

(72) Inventors: Jiacheng He, Shenzhen (CN); Jisi Wang, Shenzhen (CN); Xiaoliang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/574,904

(22) PCT Filed: Jul. 28, 2022

(86) PCT No.: PCT/CN2022/108464
§ 371 (c)(1),
(2) Date: Dec. 28, 2023

(87) PCT Pub. No.: WO2023/016263
PCT Pub. Date: Feb. 16, 2023

(65) Prior Publication Data

US 2024/0177647 A1 May 30, 2024

(30) Foreign Application Priority Data

Aug. 11, 2021 (CN) ......................... 202110919689.8

(51) Int. Cl.
*G09G 3/32* (2016.01)
*G09G 3/20* (2006.01)

(52) U.S. Cl.
CPC ... *G09G 3/2074* (2013.01); *G09G 2320/0233* (2013.01); *G09G 2360/16* (2013.01)

(58) Field of Classification Search
CPC ................... G09G 3/32; G09G 3/2074; G09G 2320/0233; G09G 2300/0452; G09G 2360/16; G09G 2320/0626; G09G 3/2092
See application file for complete search history.

(56) References Cited

U.S. PATENT DOCUMENTS 8,018,476 B2 * 9/2011 Credelle .............. G09G 3/2074 345/87
8,189,016 B2 * 5/2012 Higgins ............... G09G 3/3406 345/614

(Continued)

FOREIGN PATENT DOCUMENTS

CN 105679222 A 6/2016
CN 110275358 A 9/2019

(Continued)

OTHER PUBLICATIONS

International Search Report in Application No. PCT/CN2022/108464, dated Oct. 25, 2022, 4 pages, including translation.

*Primary Examiner* — Olga V Merkoulova
(74) *Attorney, Agent, or Firm* — Morgan, Lewis & Bockius LLP

(57) ABSTRACT

A compensation method for a display area with an under-display camera includes acquiring the attenuation compensation amount of each sub-pixel between each of sub-pixels of the display area with the under-display camera and each of sub-pixels of a non-display area without the under-display camera in a display screen at the current moment, where the sub-pixels include a red sub-pixel, a green sub-pixel, and a blue sub-pixel; acquiring the attenuation accumulation amount of each sub-pixel of each pixel in the display area with the under-display camera; determining the pixel compensation amount of each sub-pixel of each pixel in the display area with the under-display camera according to the attenuation compensation amount and the attenuation accu- (Continued)

mulation amount; and compensating each sub-pixel of each pixel in the display area with the under-display camera according to the pixel compensation amount.

17 Claims, 3 Drawing Sheets

(56) References Cited

U.S. PATENT DOCUMENTS

| | | | | |
|---|---|---|---|---|
| 2011/0019036 | A1* | 1/2011 | Okado | H04N 25/633 348/E9.037 |
| 2011/0285713 | A1* | 11/2011 | Swic | H04N 9/77 345/428 |
| 2012/0229526 | A1* | 9/2012 | Holmes | G09G 5/10 345/690 |
| 2014/0085170 | A1* | 3/2014 | Park | G09G 3/3208 345/83 |
| 2018/0342200 | A1* | 11/2018 | Morris | G09G 3/3208 |
| 2018/0374426 | A1* | 12/2018 | Chen | G09G 3/3225 |
| 2020/0234634 | A1* | 7/2020 | Li | G09G 3/3208 |
| 2021/0097943 | A1* | 4/2021 | Wyatt | H10K 59/353 |

FOREIGN PATENT DOCUMENTS

| | | | |
|---|---|---|---|
| CN | 110444150 | A | 11/2019 |
| CN | 113178160 | A | 7/2021 |

* cited by examiner

COMPENSATION METHOD FOR A DISPLAY AREA WITH AN UNDER-DISPLAY CAMERA, DEVICE, AND STORAGE MEDIUM

CROSS REFERENCE TO RELATED APPLICATIONS

This is a national stage application filed under 35 U.S.C. 371 based on International Patent Application NO. PCT/CN2022/108464, filed Jul. 28, 2022, which claims priority to Chinese Patent Application No. 202110919689.8 filed with the China National Intellectual Property Administration (CNIPA) on Aug. 11, 2021, the disclosures of which are incorporated herein by reference in its entirety.

TECHNICAL FIELD

The present disclosure relates to the field of display technology, for example, a compensation method and apparatus for a display area with an under-display camera, a device, and a storage medium.

BACKGROUND

To implement under-display camera technology, an organic light-emitting diode (OLED) hard screen is used, and special pixel arrangement and drive modes are used in an area corresponding to a camera to improve the transmittance. In the same use time, the pixel attenuation speed of an area with an under-display camera is larger than the pixel attenuation speed of an area other than the area with the under-display camera (that is, an area without the under-display camera). After a user uses a screen for a period of time (for example, 1 to 2 years), the display effect of an area with an under-display camera and the display effect of an area other than the area with the under-display camera may be inconsistent. As a result, the display effect of a terminal device is affected.

SUMMARY

The present disclosure provides a compensation method and apparatus for a display area with an under-display camera, a device, and a storage medium.

The present disclosure discloses a compensation method for a display area with an under-display camera. The method includes the following.

The attenuation compensation amount of each sub-pixel between each of sub-pixels of the display area with the under-display camera and each of sub-pixels of a non-display area without the under-display in a display screen at the current moment is acquired. The sub-pixels include a red sub-pixel, a green sub-pixel, and a blue sub-pixel.

The attenuation accumulation amount of each sub-pixel of each pixel in the display area with the under-display camera is acquired.

The pixel compensation amount of each sub-pixel of each pixel in the display area with the under-display camera is determined according to the attenuation compensation amount and the attenuation accumulation amount.

Each sub-pixel of each pixel in the display area with the under-display camera is compensated according to the pixel compensation amount.

The present disclosure discloses a compensation apparatus for a display area with an under-display camera. The apparatus includes an attenuation compensation amount acquisition module, an attenuation accumulation amount acquisition module, a pixel compensation amount determination module, and a compensation module.

The attenuation compensation amount acquisition module is configured to acquire the attenuation compensation amount of each sub-pixel between each of sub-pixels of the display area with the under-display camera and each of sub-pixels of a non-display area without the under-display camera in the display screen at the current moment. The sub-pixels include a red sub-pixel, a green sub-pixel, and a blue sub-pixel.

The attenuation accumulation amount acquisition module is configured to acquire the attenuation accumulation amount of each sub-pixel of each pixel in the display area with the under-display camera.

The pixel compensation amount determination module is configured to determine the pixel compensation amount of each sub-pixel of each pixel in the display area with the under-display camera according to the attenuation compensation amount and the attenuation accumulation amount.

The compensation module is configured to compensate each sub-pixel of each pixel in the display area with the under-display camera according to the pixel compensation amount.

The present disclosure discloses a computer device. The computer device includes a memory, a processor, and a computer program stored on the memory and executable on the processor. When executing the program, the processor performs the compensation method for a display area with an under-display camera in the present disclosure.

The present disclosure discloses a computer-readable storage medium. The storage medium stores a computer program. When executing the program, a processor performs the compensation method for a display area with an under-display camera in the present disclosure.

DETAILED DESCRIPTION

To illustrate the object, solutions and advantages of the present disclosure clearly, embodiments of the present disclosure are described hereinafter in conjunction with the drawings. It is to be noted that if not in collision, the embodiments of the present disclosure and features therein may be combined with each other in any manner.

It is to be understood that the embodiments described herein are intended to explain the present disclosure and not to limit the present disclosure.

In the subsequent description, suffixes such as "module", "part", or "unit" used to indicate elements are merely used to facilitate the description of the present disclosure, and have no particular meaning in themselves. Therefore, “module”, “part”, or “unit” may be used in a mixed manner.

Figure 1:
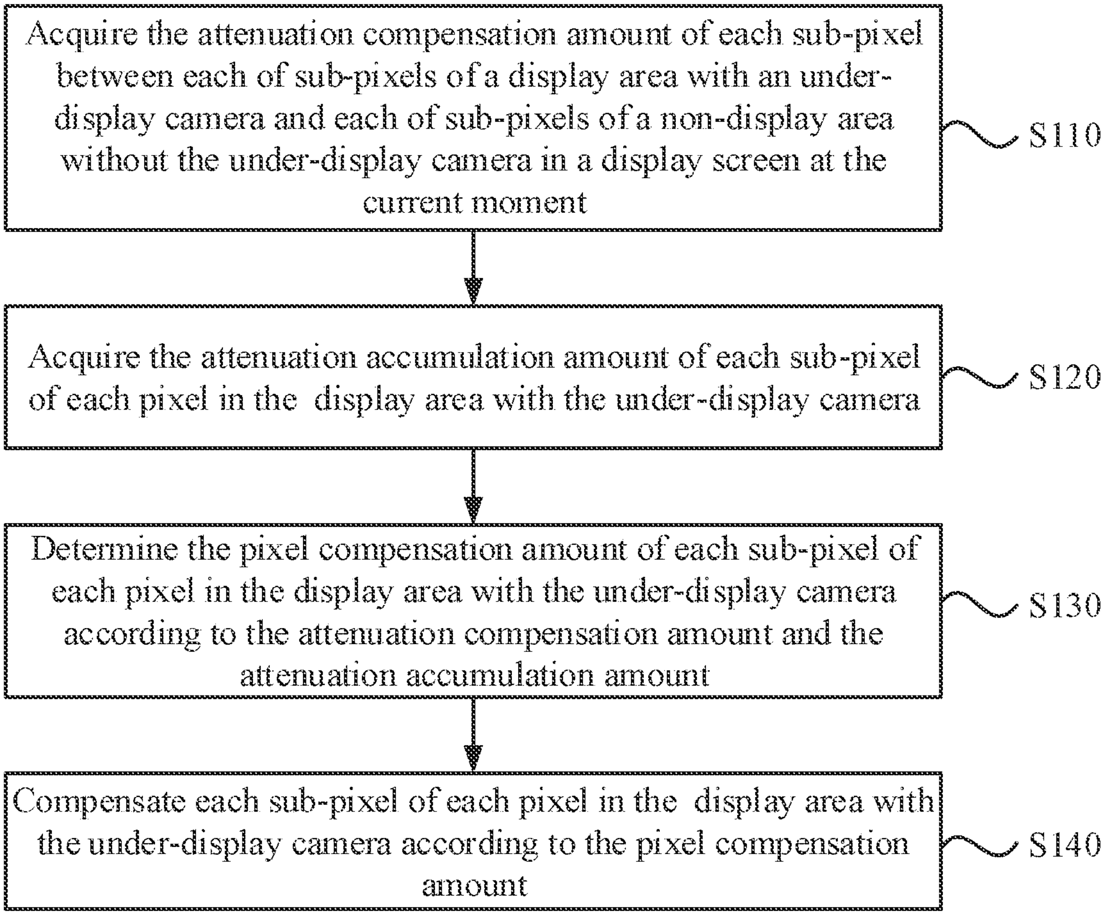
FIG. 1 is a flowchart of a compensation method for a display area with an under-display camera according to an embodiment of the present disclosure.

In an embodiment, FIG. 1 is a flowchart of a compensation method for a display area with an under-display camera according to an embodiment of the present disclosure. Pixel compensation can be performed on the display area with the under-display camera according to the method. The method may be performed by a compensation apparatus for a display area with an under-display camera. As shown in FIG. 1, the method includes S110 to S140.

In S110, the attenuation compensation amount of each sub-pixel between each of sub-pixels of the display area with the under-display camera and each of sub-pixels of a non-display area without the under-display camera in a display screen at the current moment is acquired.

Sub-pixels include a red sub-pixel (R), a green sub-pixel (G), and a blue sub-pixel (B).

Figure 2:
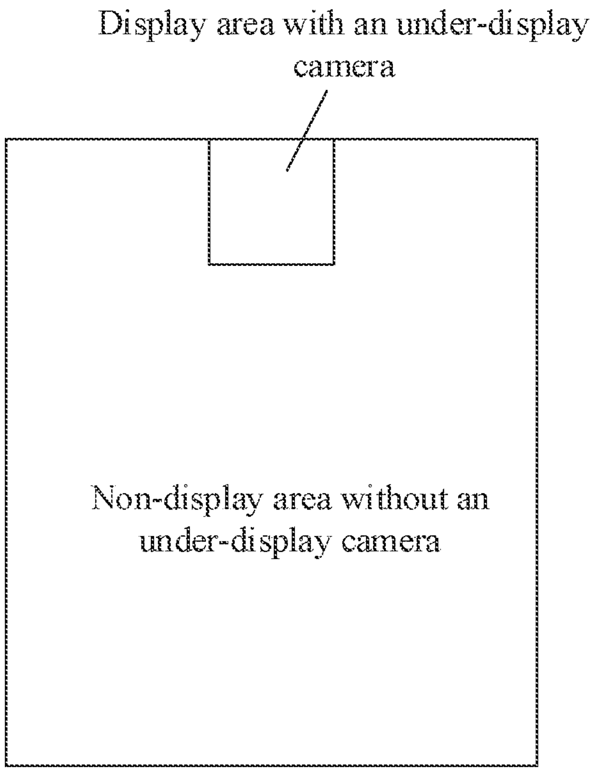
FIG. 2 is a diagram of a display screen supporting an under-display camera according to an embodiment of the present disclosure.

In this embodiment of the present disclosure, the display screen is a screen that supports an under-display camera. The display area with the under-display camera may be understood as an area in which a camera is disposed under the display screen. The non-display area without the under-display camera may be understood as an area in which no camera is disposed under the display screen. For example, FIG. 2 is a diagram of a display screen supporting an under-display camera according to an embodiment of the present disclosure. As shown in FIG. 2, the display screen includes a display area with an under-display camera (which may be simply referred to as a secondary screen) and a non-display area without the under-display camera (which may be simply referred to as a main screen).

Display contents are formed by each pixel emitting light separately and displaying different colors. Each pixel is composed of three sub-pixels: red, green, and blue (R, G, B) sub-pixels. The display content of each pixel may be composed of (R, G, B). R, G, and B are in the range of 0-255.

Figure 3:
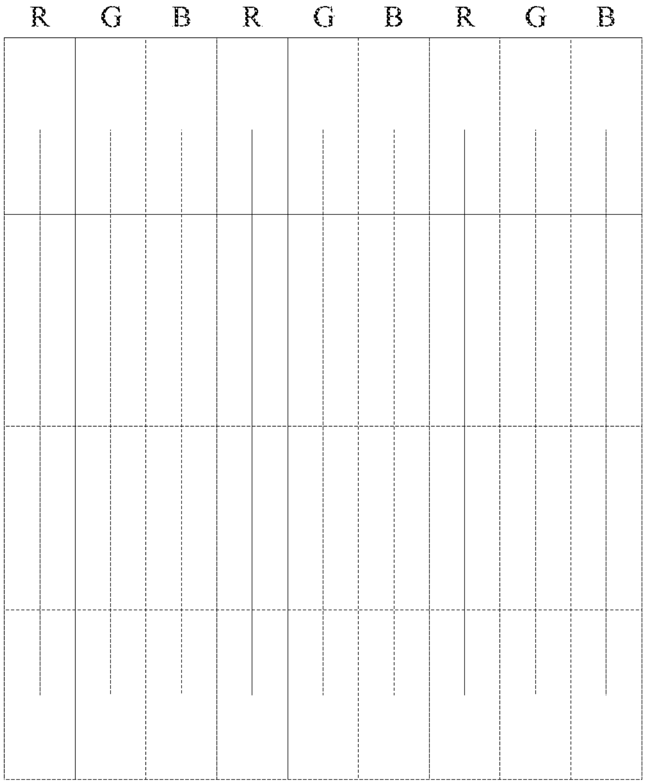
FIG. 3 is a diagram of a pixel arrangement mode in a display area with an under-display camera according to an embodiment of the present disclosure.

In an embodiment, pixels of the display area with the under-display camera may be arranged in an RGB arrangement mode. This embodiment is not limited to an RGB arrangement, and the RGB arrangement is only used as an example. A drive mode may be in a one-drive-four, one-drive-one, and one-drive-many manner. The one-drive-four may be understood that four sub-pixels are lit at the same time. For example, FIG. 3 is a diagram of a pixel arrangement mode in a display area with an under-display camera according to an embodiment of the present disclosure. As shown in FIG. 3, the pixels of the display area with the under-display camera are driven in a one-drive-four manner.

The attenuation compensation amount may be understood as the compensation amount for the attenuation between each sub-pixel of the display area with the under-display camera and each sub-pixel of the non-display area without the under-display camera.

For different display materials, each pixel in a display material may attenuate over time. Pixel attenuation may be understood that the brightness and chroma displayed by a display material may attenuate after a period of use for the same drive voltage. In this embodiment, to implement under-display camera technology, the display material of the display area with the under-display camera is different from the display material of the non-display area without the under-display camera, and the pixel attenuation of the display area with the under-display camera and the pixel attenuation of the non-display area without the under-display camera are different.

For example, the attenuation compensation amount of each sub-pixel between each of the sub-pixels of the display area with the under-display camera and each of the sub-pixels of the non-display area without the under-display camera in the display screen at the current moment is acquired in the following manners: First attenuation amount change information of each sub-pixel in the display area with the under-display camera in the display screen and second attenuation amount change information of each sub-pixel in the non-display area without the under-display camera in the display screen are acquired; a first attenuation amount is determined according to the current time and the first attenuation amount change information; a second attenuation amount is determined according to the current time and the second attenuation amount change information; and the attenuation compensation amount is determined according to the first attenuation amount and the second attenuation amount.

Attenuation amount change information represents a change in a pixel attenuation amount over time.

It is assumed that the first attenuation amount change information of each sub-pixel in the display area with the under-display camera is expressed as $a_{r1}(t)$, $a_{g1}(t)$, and $a_{b1}(t)$. $a_{r1}(t)$, $a_{g1}(t)$, and $a_{b1}(t)$ represent the changes in the attenuation amounts of R, G, and B sub-pixels in the display area with the under-display camera over time respectively. The second attenuation amount change information of each sub-pixel in the non-display area without the under-display camera is expressed as $a_{r2}(t)$, $a_{g2}(t)$, and $a_{b2}(t)$. $a_{r2}(t)$, $a_{g2}(t)$, and $a_{b2}(t)$ represent the changes in the attenuation amounts of R, G, and B sub-pixels in the non-display area without the under-display camera over time respectively.

After the time corresponding to the current moment is determined, the time corresponding to the current moment may be substituted into the first attenuation amount change information and the second attenuation amount change information to obtain the first attenuation amount and the second attenuation amount of the current moment separately. For example, assuming that the time corresponding to the current moment is $t_n$, the first attenuation amount and the second attenuation amount corresponding to an R sub-pixel are $a_{r1}(t_n)$ and $a_{r2}(t_n)$ respectively, the first attenuation amount and the second attenuation amount corresponding to a G sub-pixel are $a_{g1}(t_n)$ and $a_{g2}(t_n)$ respectively, and the first attenuation amount and the second attenuation amount corresponding to a B sub-pixel are $a_{b1}(t_n)$ and $a_{b2}(t_n)$ respectively.

In an embodiment, the attenuation compensation amount is determined in the following manner according to the first attenuation amount and the second attenuation amount: The second attenuation amount is subtracted from the first attenuation amount to obtain the attenuation compensation amount. The previous example is used as an example. At the current moment, the attenuation compensation amount of the R sub-pixel is $\beta_r = a_{r1}(t_n) - a_{r2}(t_n)$, the attenuation compensation amount of the G sub-pixel is $\beta_g = a_{g1}(t_n) - a_{g2}(t_n)$, and the attenuation compensation amount of the B sub-pixel is $\beta_b = a_{b1}(t_n) - a_{b2}(t_n)$.

In S120, the attenuation accumulation amount of each sub-pixel of each pixel in the display area with the under-display camera is acquired.

The attenuation accumulation amount may be understood as the attenuation accumulation amount of each sub-pixel in each pixel in the display area with the under-display camera in a period from the moment of the display screen starting up to the current moment.

The moment at which the display screen starts to operate may be understood as the moment at which the display screen is mounted on a terminal device and the terminal device starts to display contents after leaving a factory.

In this embodiment of the present disclosure, after the design of the display screen is completed, the position of the display area with the under-display camera is also determined. A screen having resolution of 1080*2460 in 6.92 inches is used as an example. It is assumed that the coordinate of the upper-left corner of the display screen is (0, 0), and the display area with the under-display camera is a square having an upper left corner of (500, 0) and a lower right corner of (580, 80). That is, the range of the display area with the under-display camera is $500 \le x \le 580$ and $0 \le y \le 80$. At moment t, the pixel value (R(t), G(t), B(t)) of each pixel in the display area with the under-display camera is acquired.

In an embodiment, the process of acquiring the attenuation accumulation amount of each sub-pixel of the pixel may be as follows: For each sub-pixel, the sub-pixel value of the sub-pixel at each moment in a set period is acquired; and the attenuation accumulation amount is determined according to the sub-pixel values of multiple moments and the first attenuation amount change information.

The set period is a period from the moment of the display screen starting up to the current moment. It is assumed that the moment corresponding to the start is t=0, and the current moment is $t=t_n$.

In an embodiment, the attenuation accumulation amount is determined in the following manners according to the sub-pixel values of multiple moments and the first attenuation amount change information: Sub-pixel value change information is determined according to the sub-pixel values of multiple moments, and the sub-pixel value change information is multiplied by the first attenuation amount change information; and an integral operation in the set period is performed on the multiplied information to obtain the attenuation accumulation amount.

The sub-pixel value change information represents a change in a sub-pixel value over time. The sub-pixel value change information is determined in the following manner according to the sub-pixel values of the multiple moments: Polynomial fitting is performed on the sub-pixel values of the multiple moments to obtain the sub-pixel value change information. For example, the sub-pixel value change information of each sub-pixel is R(t), G(t), and B(t). The first attenuation amount change information of each sub-pixel is $a_{r1}(t)$, $a_{g1}(t)$, and $a_{b1}(t)$. The attenuation accumulation amount of each sub-pixel is $\int_0^{t_n}(R(t)\cdot a_{r1}(t))$, $\int_0^{t_n}(G(t)\cdot a_{g1}(t))$, and $\int_0^{t_n}(B(t)\cdot a_{b1}(t))$.

In an embodiment, the attenuation accumulation amount is determined in the following manners according to the sub-pixel values of the multiple moments and the first attenuation amount change information: Third attenuation amounts of the multiple moments are determined according to the first attenuation amount change information; and the sub-pixel values of the multiple moments is multiplied by the third attenuation amounts, respectively, and the multiplication results are accumulated, so that the attenuation accumulation amount of the sub-pixel is obtained.

The sub-pixel values of each sub-pixel at moment t are R(t), G(t), and B(t) respectively. The third attenuation amounts of each sub-pixel at moment t are $a_{r1}(t)$, $a_{g1}(t)$, and $a_{b1}(t)$ respectively. The attenuation accumulation amounts of each sub-pixel are $$\sum_{t=0}^{t_n}(R(t)\cdot a_{r1}(t)),$$

$$\sum_{t=0}^{t_n}(G(t)\cdot a_{g1}(t)),$$

and $$\sum_{t=0}^{t_n}(B(t)\cdot a_{b1}(t))$$

respectively.

In S130, the pixel compensation amount of each sub-pixel of each pixel in the display area with the under-display camera is determined according to the attenuation compensation amount and the attenuation accumulation amount.

For example, after the attenuation compensation amount and the attenuation accumulation amount are obtained, the attenuation accumulation amount is divided by the attenuation compensation amount to obtain the pixel compensation amount.

For example, at the current moment, the pixel compensation amounts of each sub-pixel of each pixel are $$\frac{1}{\beta_r}\int_0^{t_n}(R(t)\cdot a_{r1}(t)),$$

$$\frac{1}{\beta_g}\int_0^{t_n}(G(t)\cdot a_{g1}(t))$$

and $$\frac{1}{\beta_b}\int_0^{t_n}(B(t)\cdot a_{b1}(t))$$

or $$\frac{1}{\beta_r}\sum_{t=0}^{t_n}(R(t)\cdot a_{r1}(t)),$$

$$\frac{1}{\beta_g}\sum_{t=0}^{t_n}(G(t)\cdot a_{g1}(t)),$$

and $$\frac{1}{\beta_b}\sum_{t=0}^{t_n}(B(t)\cdot a_{b1}(t)).$$

In S140, each sub-pixel of each pixel in the display area with the under-display camera is compensated according to the pixel compensation amount.

In this embodiment, when a sub-pixel is compensated, the current or voltage that drives the sub-pixel is compensated. For example, it is assumed that when a pixel does not attenuate, a voltage of size m is required to make the brightness and chroma of the pixel satisfy the requirements. After the pixel attenuates, if the pixel is continuously driven by the voltage of size m, the brightness and chroma of the pixel may be weakened. Here, it is necessary to compensate for the voltage (increasing the voltage value) so that the brightness and chroma of the pixel satisfy the requirements.

For example, each sub-pixel of each pixel in the display area with the under-display camera is compensated in the following manners according to the pixel compensation amount: A voltage compensation amount is determined according to the pixel compensation amount; a drive voltage is compensated according to the voltage compensation amount; and each sub-pixel of each pixel in the display area with the under-display camera is driven for display based on the compensated drive voltage.

The pixel compensation amount includes an R sub-pixel compensation amount, a G sub-pixel compensation amount, and a B sub-pixel compensation amount. Similarly, the voltage compensation amount includes an R voltage compensation amount, a G voltage compensation amount, and a B voltage compensation amount. In this embodiment, there is a correspondence between a pixel value and a drive voltage. Thus, the voltage compensation amount may be determined according to the pixel compensation amount.

After the voltage compensation amount is determined, an original drive voltage is compensated (the voltage value is increased), so that each sub-pixel of each pixel in the display area with the under-display camera is driven for display based on the compensated drive voltage.

For example, assuming that the range of the display area with the under-display camera is 500≤x≤580 and 0≤y≤80, it is necessary to compensate for 80*80 pixels. In this embodiment, the drive modes of the display screen include a one-drive-one mode and a one-drive-many mode. Assuming that a one-drive-four design is used, only the display data of 80*20 pixels needs to be stored. The compensation method for storing the minimum amount of data may be achieved by adjusting the pixel arrangement mode, the drive design, and the size of the display area with the under-display camera.

In this embodiment, the attenuation compensation amount of each sub-pixel between each sub-pixel of the display area with the under-display camera and each sub-pixel of the non-display area without the under-display camera in the display screen at the current moment is acquired. The sub-pixels include a red sub-pixel, a green sub-pixel, and a blue sub-pixel. The attenuation accumulation amount of each sub-pixel of each pixel in the display area with the under-display camera is acquired. The pixel compensation amount of each sub-pixel of each pixel in the display area with the under-display camera is determined according to the attenuation compensation amount and the attenuation accumulation amount. Each sub-pixel of each pixel in the display area with the under-display camera is compensated according to the pixel compensation amount. The compensation method for a display area with an under-display camera provided by the embodiments of the present disclosure can implement pixel compensation for the display area with the under-display camera, thereby improving the display effect.

Figure 4:
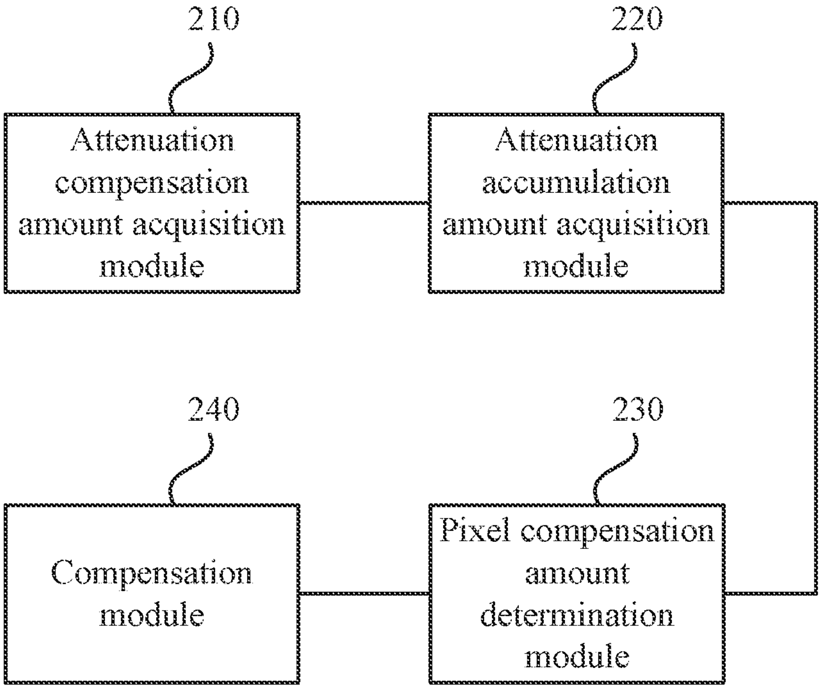
FIG. 4 is a diagram illustrating the structure of a compensation apparatus for a display area with an under-display camera according to an embodiment of the present disclosure.

FIG. 4 is a diagram illustrating the structure of a compensation apparatus for a display area with an under-display camera according to an embodiment of the present disclosure. As shown in FIG. 4, the apparatus includes an attenuation compensation amount acquisition module 210, an attenuation accumulation amount acquisition module 220, a pixel compensation amount determination module 230, and a compensation module 240.

The attenuation compensation amount acquisition module 210 is configured to acquire the attenuation compensation amount of each sub-pixel between each of sub-pixels of the display area with the under-display camera and each of sub-pixels of a non-display area without the under-display camera in the display screen at the current moment. The sub-pixels include a red sub-pixel, a green sub-pixel, and a blue sub-pixel.

The attenuation accumulation amount acquisition module 220 is configured to acquire the attenuation accumulation amount of each sub-pixel of each pixel in the display area with the under-display camera.

The pixel compensation amount determination module 230 is configured to determine the pixel compensation amount of each sub-pixel of each pixel in the display area with the under-display camera according to the attenuation compensation amount and the attenuation accumulation amount.

The compensation module 240 is configured to compensate each sub-pixel of each pixel in the display area with the under-display camera according to the pixel compensation amount.

In an embodiment, the attenuation compensation amount acquisition module 210 is also configured to acquire the first attenuation amount change information of each sub-pixel of the display area with the under-display camera in the display screen and the second attenuation amount change information of each sub-pixel of the non-display area without the under-display camera in the display screen, where the first attenuation amount change information and the second attenuation amount change information represent the change in the pixel attenuation amount over time; determine the first attenuation amount according to the current time and the first attenuation amount change information; determine the second attenuation amount according to the current time and the second attenuation amount change information; and determine the attenuation compensation amount according to the first attenuation amount and the second attenuation amount.

In an embodiment, the attenuation accumulation amount acquisition module 220 is also configured to, for each sub-pixel of each pixel in the display area with the under-display camera, acquire the sub-pixel values of each sub-pixel at multiple moments in the set period, where the set period is the period from a moment of the display screen starting up to the current moment; and determine the attenuation accumulation amount of each sub-pixel according to the sub-pixel values of each sub-pixel at the multiple moments and the first attenuation amount change information.

In an embodiment, the attenuation accumulation amount acquisition module 220 is also configured to determine third attenuation amounts at the multiple moments according to the first attenuation amount change information; and multiply the sub-pixel values at the multiple moments by the third attenuation amounts at the multiple moments, respectively, and accumulate multiplication results of the multiplying to obtain the attenuation accumulation amount of each sub-pixel.

In an embodiment, the attenuation accumulation amount acquisition module 220 is also configured to determine the sub-pixel value change information according to the sub-pixel values at the multiple moments, where the sub-pixel value change information represents a change in a sub-pixel value over time; multiply the sub-pixel value change information by the first attenuation amount change information; and perform the integral operation in the set period on the multiplied information to obtain the attenuation accumulation amount of each sub-pixel.

In an embodiment, the pixel compensation amount determination module 230 is also configured to divide the attenuation accumulation amount by the attenuation compensation amount to obtain the pixel compensation amount.

In an embodiment, the compensation module 240 is also configured to determine the voltage compensation amount according to the pixel compensation amount; compensate the drive voltage according to the voltage compensation amount; and drive multiple sub-pixels of each pixel in the display area with the under-display camera for display based on the compensated drive voltage.

Figure 5:
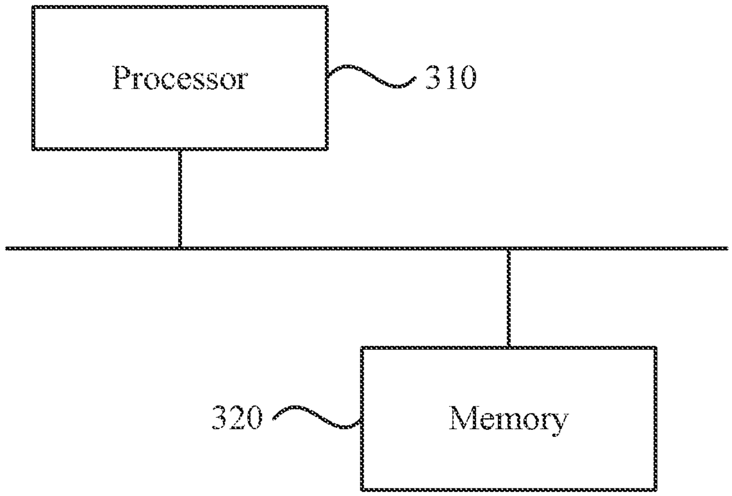
FIG. 5 is a diagram illustrating the structure of a computer device according to an embodiment of the present disclosure.

In an embodiment, FIG. 5 is a diagram illustrating the structure of a computer device according to an embodiment of the present disclosure. As shown in FIG. 5, the device provided in the present disclosure includes a processor 310 and a memory 320. One or more processors 310 may be disposed in the device, and one processor 310 is used as an example in FIG. 5. One or more memories 320 may be disposed in the device, and one memory 320 is used as an example in FIG. 5. The processor 310 of the device and the memory 320 of the device are connected by a bus or in other manners, and the connection by a bus is used as an example in FIG. 5. In an embodiment, the device is a computer device.

As a computer-readable storage medium, the memory 320 may be configured to store software programs and computer-executable programs and modules, such as program instructions/modules (for example, the attenuation compensation amount acquisition module 210, the attenuation accumulation amount acquisition module 220, the pixel compensation amount determination module 230, and the compensation module 240 in the compensation apparatus for a display area with an under-display camera) corresponding to the device according to any embodiment of the present disclosure. The memory 320 may include a program storage region and a data storage region, where the program storage region may store an operating system and an application program required by at least one function while the data storage region may store data created depending on use of a device. Additionally, the memory 320 may include a high-speed random-access memory and may also include a non-volatile memory, for example, at least one magnetic disk memory, a flash memory, or another non-volatile solid-state memory. In some examples, the memory 320 may also include memories located remotely relative to the processor 310, and these remote memories may be connected to the device via a network. Examples of the preceding network include, but are not limited to, the Internet, an intranet, a local area network, a mobile communication network, and a combination thereof.

The device provided above may be configured to execute the compensation method for a display area with an under-display camera that is provided by any preceding embodiment, and has corresponding functions and effects.

The program stored in the memory 320 may be a program instruction/module that corresponds to the compensation method applied to the display area with the under-display camera provided in the embodiments of the present disclosure. The processor 310 executes the software programs, instructions, and modules stored in the memory 320 to perform one or more function applications of the computer device and data processing, that is, to implement the compensation method applied to the display area with the under-display camera described in the above method embodiments. It is to be understood that the preceding device may perform the compensation method applied to the display area with the under-display camera provided in any embodiment of the present disclosure and has corresponding functions and effects.

An embodiment of the present disclosure provides a storage medium including computer-executable instructions. When executing the computer-executable instructions, a computer processor is configured to perform a compensation method for a display area with an under-display camera. The method includes acquiring the attenuation compensation amount of each sub-pixel between each of sub-pixels of the display area with the under-display camera and each of sub-pixels of a non-display area without the under-display camera in the display screen at the current moment, where the sub-pixels include a red sub-pixel, a green sub-pixel, and a blue sub-pixel; acquiring the attenuation accumulation amount of each sub-pixel of each pixel in the display area with the under-display camera; determining the pixel compensation amount of each sub-pixel of each pixel in the display area with the under-display camera according to the attenuation compensation amount and the attenuation accumulation amount; and compensating each sub-pixel of each pixel in the display area with the under-display camera according to the pixel compensation amount.

The storage medium may be a non-transitory storage medium.

It is to be understood by those skilled in the art that the term user equipment covers any suitable type of wireless user equipment, for example, a mobile phone, a portable data processing apparatus, a portable web browser or a vehicle-mounted mobile station.

In general, multiple embodiments of the present disclosure may be implemented in hardware or special-purpose circuits, software, logics, or any combination thereof. For example, some aspects may be implemented in hardware while other aspects may be implemented in firmware or software executable by a controller, a microprocessor, or another computing apparatus, though the present disclosure is not limited thereto.

The embodiments of the present disclosure may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in the drawings of the present disclosure may represent program steps, or may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology such as, but is not limited to, a read-only memory (ROM), a random-access memory (RAM), an optical memory apparatus and system (a digital video disc (DVD) or a compact disc (CD)). A computer-readable medium may include a non-transitory storage medium. The data processor may be of any type suitable to the local technical environment, such as, but is not limited to, a general purpose computer, a special purpose computer, a microprocessor, a digital signal processor (DSP), an application specific integrated circuit (ASIC), a field-programmable gate array (FGPA), and a processor based on a multi-core processor architecture.

The preceding are only example embodiments of the present disclosure and not intended to limit the scope of the present disclosure.

The embodiments of the present disclosure may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

The description of example embodiments of the present disclosure has been provided above through exemplary and non-restrictive examples. However, considering the drawings and the claims, various modifications and adjustments to the preceding embodiments are apparent to those skilled in the art without deviating from the scope of the present disclosure. Accordingly, the proper scope of the present disclosure is determined according to the claims.

What is claimed is:

1. A compensation method for a display area with an under-display camera, comprising:

acquiring an attenuation compensation amount of each sub-pixel between each of sub-pixels of the display area with the under-display camera and each of sub-pixels of a non-display area without the under-display camera in a display screen at a current moment, wherein the sub-pixels comprise a red sub-pixel, a green sub-pixel, and a blue sub-pixel;

acquiring an attenuation accumulation amount of each sub-pixel of each pixel in the display area with the under-display camera;

determining a pixel compensation amount of each sub-pixel of each pixel in the display area with the under-display camera according to the attenuation compensation amount and the attenuation accumulation amount; and compensating each sub-pixel of each pixel in the display area with the under-display camera according to the pixel compensation amount;

wherein acquiring the attenuation compensation amount of each sub-pixel between each of the sub-pixels of the display area with the under-display camera and each of the sub-pixels of the non-display area without the under-display camera in the display screen at the current moment comprises:

acquiring first attenuation amount change information of each sub-pixel of the display area with the under-display camera in the display screen and second attenuation amount change information of each sub-pixel of the non-display area without the under-display camera in the display screen, wherein the first attenuation amount change information and the second attenuation amount change information represent a change in a pixel attenuation amount over time;

determining a first attenuation amount according to the current time and the first attenuation amount change information;

determining a second attenuation amount according to the current time and the second attenuation amount change information; and determining the attenuation compensation amount according to the first attenuation amount and the second attenuation amount;

wherein a time corresponding to the current moment is substituted into the first attenuation amount change information and the second attenuation amount change information to obtain the first attenuation amount of the current moment and the second attenuation amount of the current moment separately, and the second attenuation amount is subtracted from the first attenuation amount to obtain the attenuation compensation amount.

2. The method according to claim 1, wherein acquiring the attenuation accumulation amount of each sub-pixel of each pixel in the display area with the under-display camera comprises:

for each sub-pixel of each pixel in the display area with the under-display camera, acquiring sub-pixel values of each sub-pixel at a plurality of moments in a set period, wherein the set period is a period from a moment of the display screen starting up to the current moment; and determining the attenuation accumulation amount of each sub-pixel according to the sub-pixel values of each sub-pixel at the plurality of moments and the first attenuation amount change information.

3. The method according to claim 2, wherein determining the attenuation accumulation amount of each sub-pixel according to the sub-pixel values of each sub-pixel at the plurality of moments and the first attenuation amount change information comprises:

determining third attenuation amounts at the plurality of moments according to the first attenuation amount change information; and multiplying the sub-pixel values at the plurality of moments by the third attenuation amounts at the plurality of moments, respectively, and accumulating multiplication results of the multiplying to obtain the attenuation accumulation amount of each sub-pixel.

4. The method according to claim 2, wherein determining the attenuation accumulation amount of each sub-pixel according to the sub-pixel values of each sub-pixel at the plurality of moments and the first attenuation amount change information comprises:

determining sub-pixel value change information according to the sub-pixel values at the plurality of moments, wherein the sub-pixel value change information represents a change in a sub-pixel value over time;

multiplying the sub-pixel value change information by the first attenuation amount change information; and performing an integral operation in the set period on the multiplied information to obtain the attenuation accumulation amount of each sub-pixel.

5. The method according to claim 1, wherein determining the pixel compensation amount of each sub-pixel of each pixel in the display area with the under-display camera according to the attenuation compensation amount and the attenuation accumulation amount comprises:

dividing the attenuation accumulation amount by the attenuation compensation amount to obtain the pixel compensation amount.

6. The method according to claim 1, wherein compensating each sub-pixel of each pixel in the display area with the under-display camera according to the pixel compensation amount comprises:

determining a voltage compensation amount according to the pixel compensation amount;

compensating a drive voltage according to the voltage compensation amount; and driving each sub-pixel of each pixel in the display area with the under-display camera for display based on the compensated drive voltage.

7. A computer device, comprising a memory, a processor, and a computer program stored on the memory and executable on the processor, wherein when executing the computer program, the processor performs:

acquiring an attenuation compensation amount of each sub-pixel between each of sub-pixels of a display area with an under-display camera and each of sub-pixels of a non-display area without the under-display camera in a display screen at a current moment, wherein the sub-pixels comprise a red sub-pixel, a green sub-pixel, and a blue sub-pixel;

acquiring an attenuation accumulation amount of each sub-pixel of each pixel in the display area with the under-display camera;

determining a pixel compensation amount of each sub-pixel of each pixel in the display area with the under-display camera according to the attenuation compensation amount and the attenuation accumulation amount; and compensating each sub-pixel of each pixel in the display area with the under-display camera according to the pixel compensation amount;

wherein when executing the computer program, the processor performs acquiring the attenuation compensation amount of each sub-pixel between each of the sub-pixels of the display area with the under-display camera and each of the sub-pixels of the non-display area without the under-display camera in the display screen at the current moment by:

acquiring first attenuation amount change information of each sub-pixel of the display area with the under-display camera in the display screen and second attenuation amount change information of each sub-pixel of the non-display area without the under-display camera in the display screen, wherein the first attenuation amount change information and the second attenuation amount change information represent a change in a pixel attenuation amount over time;

determining a first attenuation amount according to the current time and the first attenuation amount change information;

determining a second attenuation amount according to the current time and the second attenuation amount change information; and determining the attenuation compensation amount according to the first attenuation amount and the second attenuation amount;

wherein a time corresponding to the current moment is substituted into the first attenuation amount change information and the second attenuation amount change information to obtain the first attenuation amount of the current moment and the second attenuation amount of the current moment separately, and the second attenuation amount is subtracted from the first attenuation amount to obtain the attenuation compensation amount.

8. A non-transitory computer-readable storage medium, storing a computer program, wherein when executing the computer program, a processor performs:

acquiring an attenuation compensation amount of each sub-pixel between each of sub-pixels of a display area with an under-display camera and each of sub-pixels of a non-display area without the under-display camera in a display screen at a current moment, wherein the sub-pixels comprise a red sub-pixel, a green sub-pixel, and a blue sub-pixel;

acquiring an attenuation accumulation amount of each sub-pixel of each pixel in the display area with the under-display camera;

determining a pixel compensation amount of each sub-pixel of each pixel in the display area with the under-display camera according to the attenuation compensation amount and the attenuation accumulation amount; and compensating each sub-pixel of each pixel in the display area with the under-display camera according to the pixel compensation amount;

wherein when executing the computer program, the processor performs acquiring the attenuation compensation amount of each sub-pixel between each of the sub-pixels of the display area with the under-display camera and each of the sub-pixels of the non-display area without the under-display camera in the display screen at the current moment by:

acquiring first attenuation amount change information of each sub-pixel of the display area with the under-display camera in the display screen and second attenuation amount change information of each sub-pixel of the non-display area without the under-display camera in the display screen, wherein the first attenuation amount change information and the second attenuation amount change information represent a change in a pixel attenuation amount over time;

determining a first attenuation amount according to the current time and the first attenuation amount change information;

determining a second attenuation amount according to the current time and the second attenuation amount change information; and determining the attenuation compensation amount according to the first attenuation amount and the second attenuation amount;

wherein a time corresponding to the current moment is substituted into the first attenuation amount change information and the second attenuation amount change information to obtain the first attenuation amount of the current moment and the second attenuation amount of the current moment separately, and the second attenuation amount is subtracted from the first attenuation amount to obtain the attenuation compensation amount.

9. The computer device according to claim 7, wherein when executing the computer program, the processor performs acquiring the attenuation accumulation amount of each sub-pixel of each pixel in the display area with the under-display camera by:

for each sub-pixel of each pixel in the display area with the under-display camera, acquiring sub-pixel values of each sub-pixel at a plurality of moments in a set period, wherein the set period is a period from a moment of the display screen starting up to the current moment; and determining the attenuation accumulation amount of each sub-pixel according to the sub-pixel values of each sub-pixel at the plurality of moments and the first attenuation amount change information.

10. The computer device according to claim 9, wherein when executing the computer program, the processor performs determining the attenuation accumulation amount of each sub-pixel according to the sub-pixel values of each sub-pixel at the plurality of moments and the first attenuation amount change information by:

determining third attenuation amounts at the plurality of moments according to the first attenuation amount change information; and multiplying the sub-pixel values at the plurality of moments by the third attenuation amounts at the plurality of moments, respectively, and accumulating multiplication results of the multiplying to obtain the attenuation accumulation amount of each sub-pixel.

11. The computer device according to claim 9, wherein when executing the computer program, the processor performs determining the attenuation accumulation amount of each sub-pixel according to the sub-pixel values of each sub-pixel at the plurality of moments and the first attenuation amount change information by:

determining sub-pixel value change information according to the sub-pixel values at the plurality of moments, wherein the sub-pixel value change information represents a change in a sub-pixel value over time;

multiplying the sub-pixel value change information by the first attenuation amount change information; and performing an integral operation in the set period on the multiplied information to obtain the attenuation accumulation amount of each sub-pixel.

12. The computer device according to claim 7, wherein when executing the computer program, the processor performs determining the pixel compensation amount of each sub-pixel of each pixel in the display area with the under-display camera according to the attenuation compensation amount and the attenuation accumulation amount by:

dividing the attenuation accumulation amount by the attenuation compensation amount to obtain the pixel compensation amount.

13. The computer device according to claim 7, wherein when executing the computer program, the processor performs compensating each sub-pixel of each pixel in the display area with the under-display camera according to the pixel compensation amount by:

determining a voltage compensation amount according to the pixel compensation amount;

compensating a drive voltage according to the voltage compensation amount; and driving each sub-pixel of each pixel in the display area with the under-display camera for display based on the compensated drive voltage.

14. The medium according to claim 8, wherein when executing the computer program, the processor performs acquiring the attenuation accumulation amount of each sub-pixel of each pixel in the display area with the under-display camera by:

for each sub-pixel of each pixel in the display area with the under-display camera, acquiring sub-pixel values of each sub-pixel at a plurality of moments in a set period, wherein the set period is a period from a moment of the display screen starting up to the current moment; and determining the attenuation accumulation amount of each sub-pixel according to the sub-pixel values of each sub-pixel at the plurality of moments and the first attenuation amount change information.

15. The medium according to claim 14, wherein when executing the computer program, the processor performs determining the attenuation accumulation amount of each sub-pixel according to the sub-pixel values of each sub-pixel at the plurality of moments and the first attenuation amount change information by:

determining third attenuation amounts at the plurality of moments according to the first attenuation amount change information; and multiplying the sub-pixel values at the plurality of moments by the third attenuation amounts at the plurality of moments, respectively, and accumulating multiplication results of the multiplying to obtain the attenuation accumulation amount of each sub-pixel.

16. The medium according to claim 14, wherein when executing the computer program, the processor performs determining the attenuation accumulation amount of each sub-pixel according to the sub-pixel values of each sub-pixel at the plurality of moments and the first attenuation amount change information by:

determining sub-pixel value change information according to the sub-pixel values at the plurality of moments, wherein the sub-pixel value change information represents a change in a sub-pixel value over time;

multiplying the sub-pixel value change information by the first attenuation amount change information; and performing an integral operation in the set period on the multiplied information to obtain the attenuation accumulation amount of each sub-pixel.

17. The medium according to claim 8, wherein when executing the computer program, the processor performs determining the pixel compensation amount of each sub-pixel of each pixel in the display area with the under-display camera according to the attenuation compensation amount and the attenuation accumulation amount by:

dividing the attenuation accumulation amount by the attenuation compensation amount to obtain the pixel compensation amount.

* * * * *